(12) United States Patent
MacNeill (10) Patent No.: US 8,843,448 B1
(45) Date of Patent: Sep. 23, 2014

(54) METHOD AND SYSTEM FOR RENAMED DIRECTORY HANDLING FOR INCREMENTAL FILE MIGRATION

(71) Applicant: EMC Corporation, Hopkinton, MA (US)

(72) Inventor: Stuart D. MacNeill, South Queensberry (GB)

(73) Assignee: EMC Corporation, Hopkinton, MA (US)

( * ) Notice: Subject to any disclaimer, the term of this patent is extended or adjusted under 35 U.S.C. 154(b) by 99 days.

(21) Appl. No.: 13/710,893

(22) Filed: Dec. 11, 2012

(51) Int. Cl.
*G06F 17/00* (2006.01)
*G06F 7/00* (2006.01)
*G06F 17/30* (2006.01)

(52) U.S. Cl.
CPC .................. *G06F 17/30079* (2013.01)
USPC ........... 707/646; 707/647; 707/650; 707/651; 707/652; 707/653; 707/655; 707/658; 707/664; 707/669

(58) Field of Classification Search
CPC .......................... G06F 17/30079; G06F 17/303
USPC ......... 707/646, 647, 650, 651, 653, 658, 664, 707/669, 652
See application file for complete search history.

(56) References Cited

U.S. PATENT DOCUMENTS

| 6,366,930 B1 * | 4/2002 | Parker et al. ........................... 1/1 |
| 8,606,751 B1 * | 12/2013 | Starling et al. ................ 707/634 |
| 2014/0108475 A1 * | 4/2014 | Yamada et al. ............... 707/829 |

* cited by examiner

*Primary Examiner* — Rehana Perveen
*Assistant Examiner* — Robert F May
(74) *Attorney, Agent, or Firm* — Drgosits & Noah LLP; Todd A. Noah (57) ABSTRACT

Renamed directory handling for incremental file migration is described. A directory is stored in a storage device. An inode number associated with the directory in a directory table is identified. A determination is made whether the inode number equals an inode number associated with another directory in the directory table. At least one of a file and a subdirectory associated with the directory in the file system is stored into the directory in the storage device if the inode number equals the inode number associated with another directory in the directory table.

20 Claims, 3 Drawing Sheets

METHOD AND SYSTEM FOR RENAMED DIRECTORY HANDLING FOR INCREMENTAL FILE MIGRATION

BACKGROUND

If a software error corrupts a database, or if erroneous data updates the database, a database administrator may restore the database to a previous uncorrupted state that does not include the erroneous data. A backup application executes a backup operation either occasionally or continuously to enable this restoration, storing each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore the corresponding backup files for that state to the database.

The standard Network Data Management Protocol (NDMP) provides a mechanism to facilitate file system backup and restore operations between compatible storage devices and backup devices. However, NDMP is unsuitable for heterogeneous backup and restore operations when the backup needs to be created for a source device and stored on a storage device that does not support any of the source device's data formats. NDMP can also be used to provide file and directory migration functionality to copy data from a source device to a storage device by connecting the source device to the storage device, executing a backup operation on the source device, and executing a restore operation on the storage device. Similar to the backup and restore operations using NDMP, this "NDMP copy" process functions properly only if the source and storage devices support at least one compatible data format. NDMP enables an incremental backup by specifying that only files and directories modified after a selected point in time need to be copied from the source device to the storage device.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

In the prior art, NDMP does not correctly migrate renamed directories from a source device to a storage device using the incremental NDMP copy procedure. For example, if a system user renames a directory A that includes two files as a renamed directory B on a source device, but the two files are not modified, NDMP identifies one modified directory B and no modified files that need to be updated, and provides a copy of the renamed directory B with no files to the storage device. The storage device stores an empty directory B along with the previously stored directory A with its two files. In this example, the backup data stored on the storage device no longer matches the data stored on the source device, which defeats the goal of accurately maintaining backup data for potentially restoring the source device.

Embodiments herein provide an EMC® cloud tiering appliance that uses NDMP to enable heterogeneous directory and file migration functionality. The cloud tiering appliance functions in the middle of a NDMP copy procedure to perform data format conversions between the source and storage devices. The cloud tiering appliance connects to the source device using NDMP, initiates a backup operation, connects to the storage device using NDMP, and initiates a restore operation. The cloud tiering appliance receives the backup data from the source device, parses the backup data's format, and converts the parsed backup data to a format supported by the storage device. Then the cloud tiering appliance streams the converted backup data to the storage device, where the converted backup data is restored. The cloud tiering appliance may use this process to perform an initial full migration, followed by a number of incremental migrations to migrate any directories and/or files that are modified since the most recent file migration.

The cloud tiering appliance uses inodes to enable correct migration of renamed directories between a source device and a storage device. An inode, or index node, stores all of the information about a file or a directory, such as ownership, access inode, and type, but not data content, name, or location in a file system. Since each directory is associated with its own inode, any renamed directory is still associated with the same inode, which is identified by an integer number, often referred to as an inode number.

The cloud tiering appliance uses NDMP to facilitate the correct incremental migration of file and directory data, including renamed directories, between source and storage devices. After the cloud tiering appliance uses NDMP to store a directory in a storage device, the cloud tiering appliance may store the updated directory and its associated inode in a directory table. Then the cloud tiering appliance identifies an inode number associated with the directory in directory table. For example, after the directory A is renamed as the directory B on the source device, the cloud tiering appliance stores an empty directory B on the storage device and identifies the inode number 1 of the directory B in the directory table. Then the cloud tiering appliance determines whether the identified inode number equals an inode number for another directory in the directory table. For example, the cloud tiering appliance determines whether the inode number 1 for the new directory B equals the inode number 1 for the directory A that is already stored in the directory table. If the identified inode number equals the inode number for another directory in the directory table, the cloud tiering appliance stores at least a file and/or a subdirectory for the renamed directory in the file system into the directory in the storage device. For example, the cloud tiering appliance determines that the inode number 1 for the new directory B equals the inode number 1 for the directory A previously stored in the directory table, thereby identifying the new directory B as the renamed version of the previously stored directory A. The cloud tiering appliance responds to this identification of a renamed directory by storing any files and any subdirectories on the source device for the new directory B, such as the two files previously stored in the storage device for the directory A, into the previously empty directory B stored on the storage device. The cloud tiering appliance enables correct migration of renamed directories between source and storage devices and uses NDMP to facilitate the incremental migration of file and directory data between source and storage devices of different types that support incompatible data formats.

Figure 1:
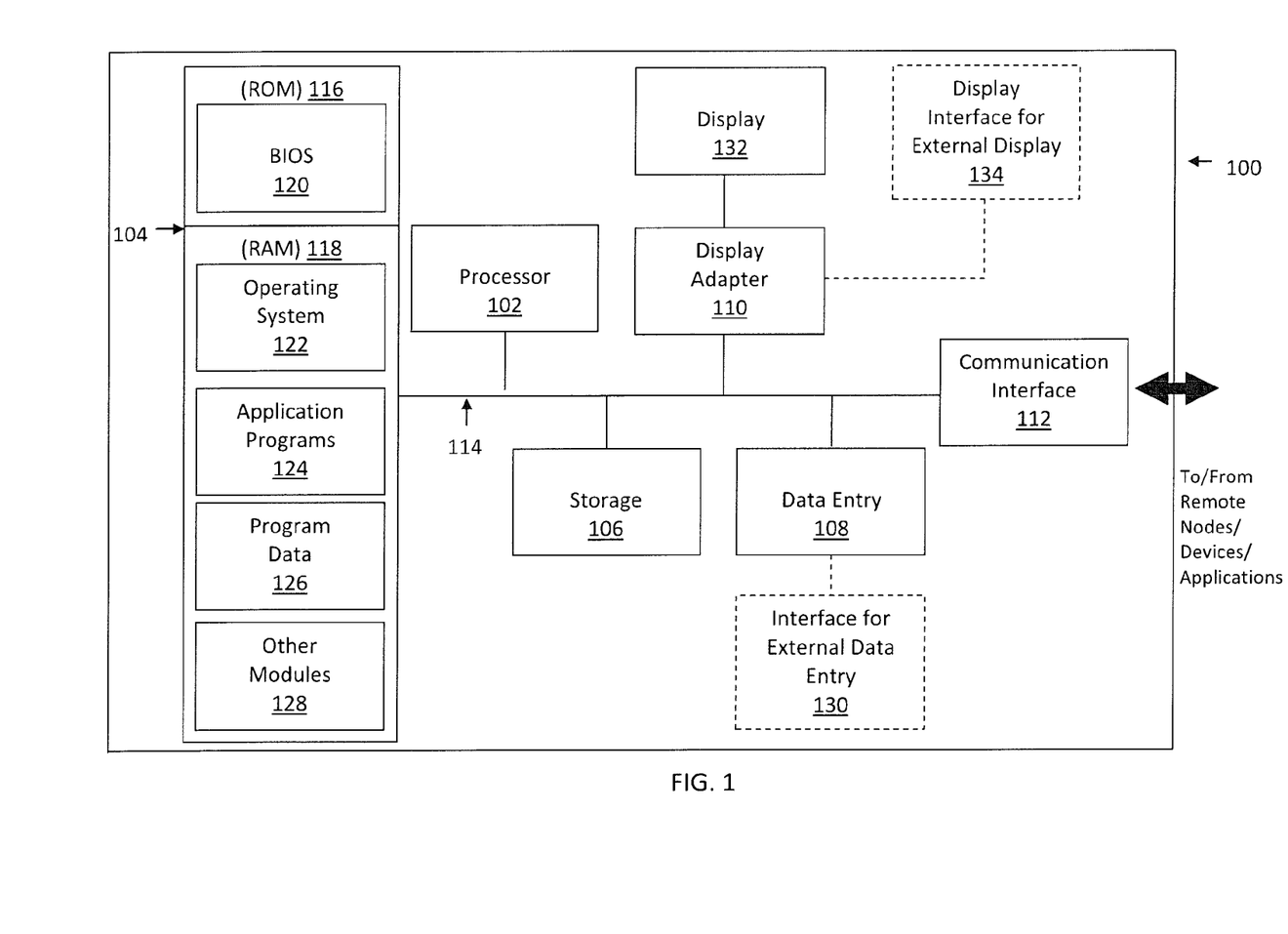
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for renamed directory handling for incremental file migration.

In the prior art, NDMP does not function properly if the source and storage devices support incompatible data formats, and NDMP does not correctly migrate renamed directories from a source device to a storage device using the incremental NDMP copy procedure. Embodiments herein enable correct migration of renamed directories between source and storage devices and use NDMP to facilitate the incremental migration of file and directory data between source and storage devices of different types that support incompatible data formats.

Figure 2:
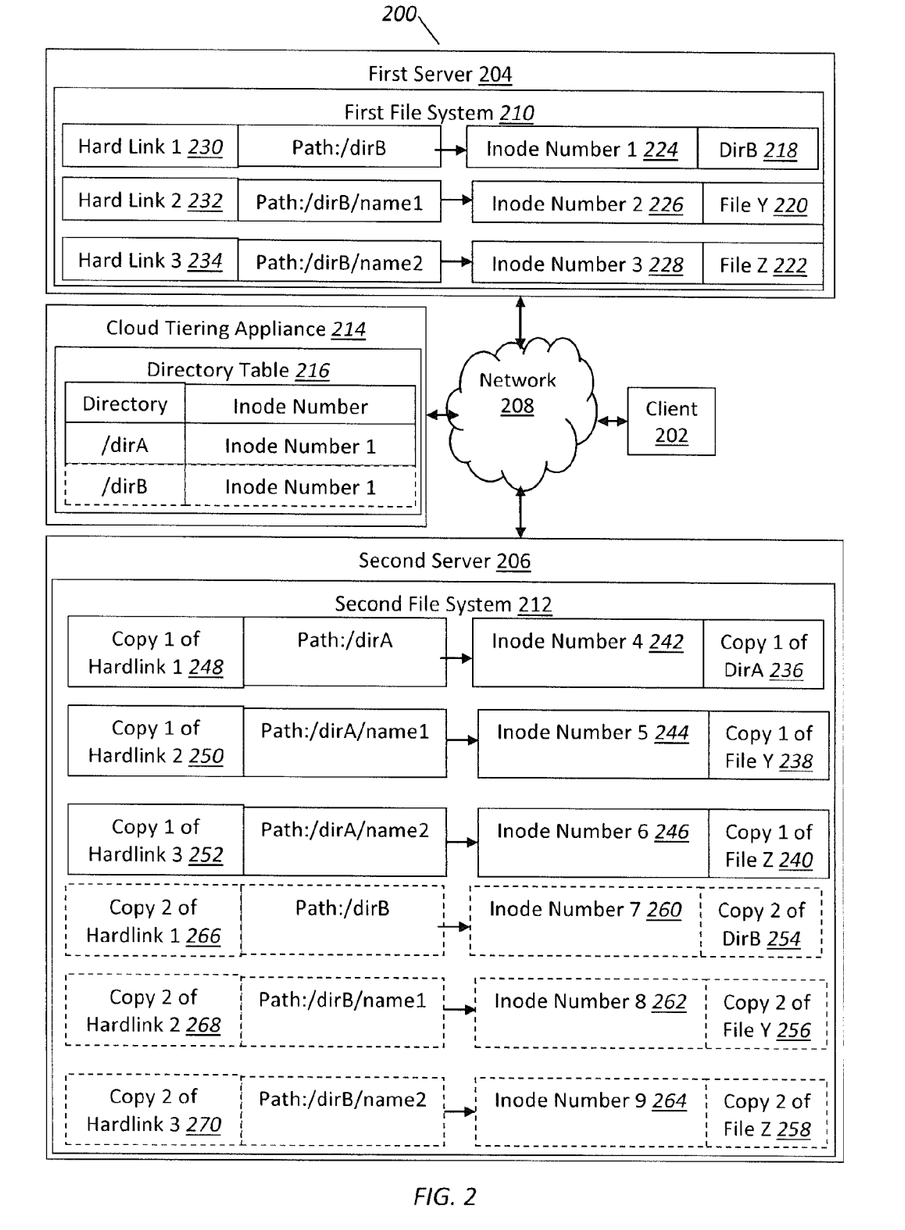
FIG. 2 illustrates a block diagram of an example system for renamed directory handling for incremental file migration, under an embodiment.

FIG. 2 illustrates a block diagram of a system that implements renamed directory handling for incremental file migration, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a first server 204 and a second server 206 that are provided by a hosting company. The client 202 and the servers 204-206 communicate via a network 208. The first server 204 includes a first file system 210, while the second server 206 includes a second file system 212. The first server 204 migrate files to the second server 206 via a cloud tiering appliance 214. The cloud tiering appliance 214 includes a directory table 216. Although FIG. 2 depicts the system 200 with one client 202, two servers 204-206, one network 208, two file systems 210-212, one cloud tiering appliance 214, and one directory table 216, the system 200 may include any number of clients 202, servers 204-206, networks 208, file systems 210-212, cloud tiering appliances 214, and directory tables 216. The client 202 and the servers 204-206 may each be substantially similar to the system 100 depicted in FIG. 1.

FIG. 2 depicts an example of directories and files that are stored in the first file system 210 by the first server 204, migrated via the cloud tiering appliance 214 to be stored in the second file system 212 by the second server 206, stored in the second file system 212 by the second server 206 as a backup copy of the first file system 210, and then renamed in the first file system 210. FIG. 2 depicts the first file system 210 after a directory named directory A was fully migrated to the second file system 212 and then renamed as a directory B in the first file system 210. The first file system 210 includes a directory B 218 (previously named directory A 218), a file Y 220, and a file Z 222. Each of the directory and the files 218-222 is uniquely identified within the first file system 210 by a numerical inode number. The directory B 218 (previously named directory A 218) is uniquely identified within the first file system 210 by the inode number 1 224, the file Y 220 is uniquely identified within the first file system 210 by the inode number 2 226, and the file Z 222 is uniquely identified within the first file system 210 by the inode number 3 228. The first file system 210 also includes a hard link 1 230, a hard link 2 232, and a hard link 3 234. Each of the hard links 230-234 has an associated path that indicates the corresponding hard link's location within a hierarchical directory tree structure. The hard link 1 230 has the associated path /dirB (previously named /dirA), the hard link 2 232 has the associated path /dirB/name1 (previously named /dirA/name1), and the hard link 3 234 has the associated path /dirB/name2 (previously named /dirA/name2). Each of the hard links 230-234 maintains a path value and a reference to one of the files 218-222 in the first file system 210. The hard link 1 230 references the directory B 218 (previously named directory A 218) via the inode number 1 224, the hard link 2 232 references the file Y 220 via the inode number 2 226, and the hard link 3 234 references the file Z 222 via the inode number 3 228.

The cloud tiering appliance 214 maintains the directory table 216 during the process of file migration from the first file system 210 to the second file system 212. The directory table 216 may include the directories /dirA and /dirB, as well as their corresponding inode numbers, which is the same inode number 1 for each directory in this example. FIG. 2 illustrates the later addition of the directory /dirB by using dashed lines to depict the outlines of the directory /dirB and its corresponding inode number 1.

The objective of the initial full file migration performed by the cloud tiering appliance 214 is to copy the various hard links, paths, and files present within the first file system 210 into the second file system 212. In the first, or baseline, phase of the initial full file migration, the cloud tiering appliance 214 opens an NDMP connection to the first server 204 and instructs the first server 204 to perform an NDMP backup operation which streams the contents of the first file system 210 over the NDMP connection. Then the cloud tiering appliance 214 opens an NDMP connection to the second server 206 and instructs the second server 206 to perform an NDMP restore operation. The cloud tiering appliance 214 then streams the data received from the backup operation into the connection with the second server 206. The second server 206 consumes this data stream and creates copies of the files, paths, and hard links in the second file system 212, thereby copying the contents of the first file system 210 into the second file system 212.

FIG. 2 depicts the second file system 212 after a directory named directory A was fully migrated from the first file system 210, but before an incremental migration followed the directory A being renamed as the directory B in the first file system 210. The second file system 212 includes a copy 1 of directory A 236, a copy 1 of file Y 238, and a copy 1 of file Z 240. The copy 1 of directory A 236 is uniquely identified within the second file system 212 by the inode number 4 242, the copy 1 of file Y 238 is uniquely identified within the second file system 212 by the inode number 5 244, and the copy 1 of file Z 240 is uniquely identified within the second file system 212 by the inode number 6 246. Although the content in the copies of the directory and files 236-240 stored in the second file system 212 are identical to the content in the directory and files 218-222 stored in the first file system 210, the inode numbers 242-246 stored in the second file system 212 are not identical to the inode numbers 224-228 stored in the first file system 210. The second file system 212 cannot store the same inode values that are received from the first file system 210 via a NDMP stream because the second file system 212 may have already allocated these inode values to other files (not depicted in FIG. 2) stored by the second file system 212. Therefore, while the file Y 220 is uniquely identified within the first file system 210 by the inode number 2 226, which has the inode value of 2, the copy of file Y 238 is uniquely identified within the second file system 212 by the inode number 5 244, which has the inode value of 5, not the inode value of 2 from a copy of the inode value 2.

The second file system 212 also includes a copy 1 of hard link 1 248, a copy 1 of hard link 2 250, and a copy 1 of hard link 3 252. The copy 1 of hard link 1 248 has the same associated path /dirA as the hard link 1 230 had before the directory A was renamed as the directory B, the copy 1 of hard link 2 250 has the same associated path /dirA/name1 as the hard link 2 232 had before the directory A was renamed as the directory B, and the copy 1 of hard link 3 252 has the associated path /dirA/name2 as the hard link 3 234 had before the directory A was renamed as the directory B. Each of the copies of hard links 248-252 maintains a path value and a reference to one of the copies of the directory and files 236-240 in the second file system 212. The copy 1 of hard link 1 248 references the copy 1 of directory A 236 via the inode number 4 242, the copy 1 of hard link 2 250 references the copy 1 of file Y 238 via the inode number 5 244, and the copy 1 of hard link 3 252 references the copy 1 of file Z 240 via the inode number 6 246.

After an incremental migration followed the directory A being renamed as the directory B in the first file system 210, the second file system 212 later adds a copy 2 of directory B 254, a copy 2 of file Y 256, and a copy 2 of file Z 258. The copy 2 of directory B 254 is uniquely identified within the second file system 212 by the inode number 7 260, the copy 2 of file Y 256 is uniquely identified within the second file system 212 by the inode number 8 262, and the copy 2 of file Z 258 is uniquely identified within the second file system 212 by the inode number 9 264. After an incremental migration followed the directory A being renamed as the directory B in the first file system 210, the second file system 212 also adds a copy 2 of hard link 1 266, a copy 2 of hard link 2 268, and a copy 2 of hard link 3 270. The copy 2 of hard link 1 266 has the same associated path /dirB as the hard link 1 230, the copy 2 of hard link 2 268 has the same associated path /dirB/name1 as the hard link 2 232, and the copy 2 of hard link 3 252 has the associated path /dirB/name2 as the hard link 3 234. Each of the copies of hard links 266-270 maintains a path value and a reference to one of the copies of the directory and files 254-258 in the second file system 212. The copy 2 of hard link 1 266 references the copy 2 of directory B 254 via the inode number 7 260, the copy 2 of hard link 2 268 references the copy 2 of file Y 256 via the inode number 8 262, and the copy 2 of hard link 3 270 references the copy 2 of file Z 258 via the inode number 9 264. FIG. 2 illustrates the later addition of the copies of the directory and files 254-258, the inode numbers 260-264, the copies of the hard links 266-270, and the corresponding paths by using dashed lines to depict the outlines of the copies of the directory and files 254-258, the inode numbers 260-264, the copies of the hard links 266-270, and the corresponding paths.

The second file system 212 stored the new copy 2 of directory B 254 because the first file system 210 indicated that the directory B 218 had been modified when the directory B 218 was renamed from the previously named directory A 218, and a copy of a directory is incrementally migrated and stored for each modified directory. When the cloud tiering appliance 214 migrates a copy of the directory B 218 that had been recently renamed by the first file system 210 to the second file system 212, the second file system 212 stores the copy 2 of the directory B 254, but the cloud tiering appliance 214 does not migrate any copy of the file Y 220 or the file Z 222 because the first file system 210 indicates that no files had been modified since the previous incremental migration.

In this example, the backup data stored on the second file system 212 no longer matches the data stored on the first file system 210, which defeats the goal of accurately maintaining backup data for potentially restoring the first file system 210. Furthermore, if a deletion handling function executes and compares the directories of the first file system 210 and the second file system 212, the deletion handling function may detect only the directory B 218 on the first file system 210 and detect both the copy 1 of directory A 236 and the empty copy 2 of directory B 254 on the second file system 212. The deletion handling function may respond to this mismatch by determining that the first file system 210 deleted the directory that was previously named directory A 218, and therefore delete the copy 1 of directory A 236 from the second file system 212, leaving only the empty copy 2 of directory B 254 on the second file system 212. If the copy 1 of directory A 236 is the root directory, NDMP's mishandling of the renamed directory B 218 could result in the deletion handling function deleting every backup file from the second file system 212.

The functioning of the cloud tiering appliance 214 is illustrated in the following examples for a situation when the first file system 210 has renamed the previously named directory A 218 as the newly named directory B 218 in the first file system 210 after the most recent incremental file migration for creating a backup of the first file system 210. The cloud tiering appliance 214 connects to a source device via NDMP to initiate a NDMP backup operation and receive a directory from the source device. For example, the cloud tiering appliance 214 connects to the first server 204 via NDMP, initiates a NDMP backup operation, and receives a copy of the directory B 218 from the first file system 210. The cloud tiering appliance 214 does not receive a copy of the file Y 220 or a copy of the file Z 222 because the file Y 220 and the file Z 222 have not been modified since the most recent incremental file migration for creating a backup of the first file system 210.

If the source device and the storage device support incompatible data formats, the cloud tiering appliance 214 parses the data for the directory and converts the data to a data format that is supported by the storage device. For example, the cloud tiering appliance 214 parses the data for the directory B 218, and converts this data from a data format supported by the first server 204 to another data format supported by the second server 206. The cloud tiering appliance 214 is configured prior to file migration to specify the data formats used by the source device and the storage device. The cloud tiering appliance 214 may be modified to have the capability to convert the parsed data from any data format to any other data format.

The cloud tiering appliance 214 connects to a storage device via NDMP to initiate a NDMP restore operation, and stores a directory on the storage device. For example, the cloud tiering appliance 214 connects to the second server 206 via NDMP, initiates a NDMP restore operation, and stores the copy 2 of directory B 254 on the second file system 212. The cloud tiering appliance 214 stores the copy 2 of directory B 254 as an empty directory in the second file system 212 because the first file system 210 indicated that neither the file Y 220 nor the file Z 222 had been modified since the most recent incremental file migration for creating a backup of the first file system 210. After the cloud tiering appliance 214 stores a directory on the storage device, the cloud tiering appliance 214 may store the directory and an index node number associated with the directory in a directory table. For example, the cloud tiering appliance 214 stores a copy of the directory B 218 and the inode number 1 in the directory table 216 to maintain an updated table for each directory stored in the second file system 212 after each incremental file migration.

The cloud tiering appliance 214 identifies an inode number associated with the directory in a directory table. For example, the cloud tiering appliance 214 identifies the inode number 1 for the directory B in the directory table 216.

The cloud tiering appliance 214 determines whether the identified inode number equals an inode number for another directory in the directory table 216. The cloud tiering appliance 214 can quickly determine whether the identified inode number is already in the baseline database 216, which would indicate that the directory is a renamed directory. The cloud tiering appliance 214 quickly conducts an inode number comparison rather than conducting a sub-tree walk on every directory in the directory tree to compare the directory B 218 and its files 220-222 against every directory and its files that are stored in the first file system 210, a comparison which could consume a significant amount of time and resources. For example, the cloud tiering appliance 214 determines whether the inode number 1 equals any of the other inode numbers in the directory table 216. If the identified inode number equals an inode number for another directory in the directory table 216, the cloud tiering appliance 214 handles a renamed directory. If the identified inode number does not equal any inode number for another directory in the directory table 216, the cloud tiering appliance 214 does not handle a renamed directory. If an inode number in the directory table 216 indicates that a directory is both a renamed directory and a subdirectory, the cloud tiering appliance 214 may delete the empty copy of the directory from the storage device, and recreate the copy of the directory as a subdirectory within the corresponding directory structure in the storage device.

The cloud tiering appliance 214 stores a file and/or a subdirectory associated with a renamed directory in the file system into the directory that was empty in a storage device. For example, the cloud tiering appliance 214 initiates a NDMP backup operation for the file Y 220 and the file Z 222 for the renamed directory B 218 in the first file system 210 to store copies of the file Y 220 and the file Z 222 into the copy 2 of directory B 254 that was empty in the second file system 212 (the directory and the files are shown by dashed lines in FIG. 2). If the renamed directory B 218 also includes any subdirectories in the first file system 210, and these subdirectories included any files, the cloud tiering appliance 214 would initiate a NDMP backup operation for the subdirectories and the subdirectories' files, and store copies of the subdirectories and the subdirectories' files into the copy 2 of directory B 254 in the second file system 212.

The cloud tiering appliance 214 deletes a previously used directory from a storage device. For example, the cloud tiering appliance 214 deletes the previously used copy 2 of directory A 236 and the corresponding files, the copy 1 of file Y 238 and the copy 1 of the file Z 240, from the second file system 212 (not shown in FIG. 2). The cloud tiering appliance 214 can delete the previously used copy 2 of directory A 236 from the second file system 212 because the cloud tiering appliance 214 has already stored the copies of the file Y 220 and the file Z 222 for the renamed directory B 218 in the first file system 210 into the copy 2 of directory B 254 that was previously empty. This directory deletion results in the copies of the directory, files, and paths stored in the second server 206 matching the directory, files, and paths stored in the first server 204. The cloud tiering appliance 214 enables correct migration of renamed directories between the first server 204 and the second server 206, and uses NDMP to facilitate the incremental migration of file and directory data between the first server 204 and the second server 206 even if the first server 204 and the second server 206 support incompatible data formats.

Figure 3:
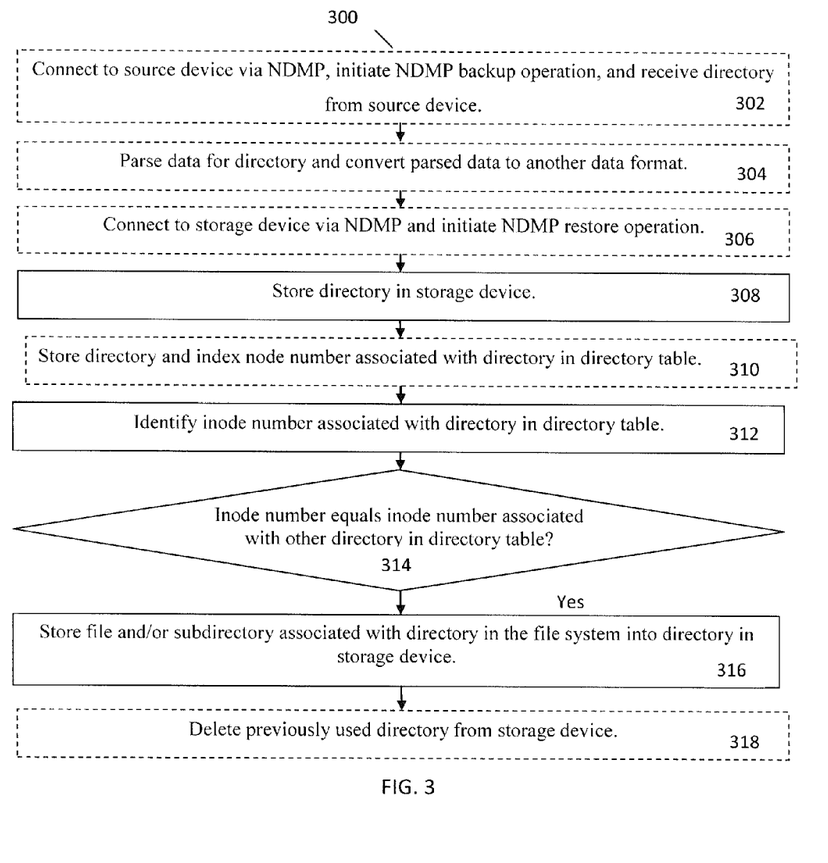
FIG. 3 is a flowchart that illustrates a method of renamed directory handling for incremental file migration, under an embodiment.

FIG. 3 is a flowchart that illustrates a method of renamed directory handling for incremental file migration. Flowchart 300 illustrates method acts illustrated as flowchart blocks for certain steps involved in and/or between the client 202 and/or the servers 204-206 of FIG. 2.

A source device is optionally connected via NDMP to initiate a NDMP backup operation and receive a directory from a source device, act 302. For example, the cloud tiering appliance 214 connects to the first server 204 via NDMP, initiates a NDMP backup operation, and receives a copy of the directory B 218 from the first file system 210.

Data for the directory is optionally parsed and optionally converted to another data format, act 304. For example, the cloud tiering appliance 214 parses the data for the directory B 218, and converts this data from a data format supported by the first server 204 to another data format supported by the second server 206.

A storage device is optionally connected via NDMP to initiate a NDMP restore operation, act 306. For example, the cloud tiering appliance 214 connects to the second server 206 via NDMP and initiates a NDMP restore operation.

A directory is stored in a storage device, act 308. For example, the cloud tiering appliance 214 stores the copy 2 of directory B 254 in the second file system 212.

A directory and an index node number associated with the directory are optionally stored in a directory table, act 310. For example, the cloud tiering appliance 214 stores a copy of the directory B and the inode number 1 in the directory table 216.

An inode number associated with a directory is identified in a directory table, act 312. For example, the cloud tiering appliance 214 identifies the inode number 1 for the directory B in the directory table 216.

A determination is made whether the identified inode number equals an inode number for another directory in a directory table, act 314. For example, the cloud tiering appliance 214 determines whether the inode number 1 equals any other inode number in the directory table 216. If the identified inode number equals an inode number for another directory in a directory table, the flowchart 300 continues to act 316. If the identified inode number does not equal any inode number for another directory in a directory table, the flowchart 300 terminates.

A file and/or a subdirectory for a directory in a file system is stored into a directory into a storage device, act 316. For example, the cloud tiering appliance 214 stores copies of the file Y 220 and the file Z 222 for the renamed directory B 218 in the first file system 210 into the copy 2 of directory B 254 that was empty in the second file system 212 (the directory and the files are shown by dashed lines in FIG. 2).

A previously used directory is optionally deleted from a storage device, act 318. For example, the cloud tiering appliance 214 deletes the previously used copy 2 of directory A 242 and the corresponding files, the copy 1 of file Y 238 and the copy 1 of the file Z 240, from the second file system 212 (not shown in FIG. 2).

Although FIG. 3 depicts the acts 302-318 occurring in a specific order, the acts 302-318 may occur in another order. Embodiments herein enable the correct migration of renamed directories between the first server 204 and the second server 206, and use NDMP to facilitate the incremental migration of file and directory data between the first server 204 and the second server 206 even if the first server 204 and the second server 206 support incompatible data formats.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best inode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for renamed directory handling for incremental file migration, the system comprising:
   a processor-based application executed on a computer and configured to:
   store a directory in a storage device;
   identify an index node number associated with the directory in a directory table;
   determine whether the index node number equals an index node number associated with another directory in the directory table; and
   store at least one of a file and a subdirectory associated with the directory in a file system into the directory in the storage device in response to a determination that the index node number equals the index node number associated with the other directory in the directory table.

2. The system of claim 1, wherein the directory in the file system comprises a directory that was modified in the source device after a previous directory was received to be stored in the storage device.

3. The system of claim 1, wherein the processor-based application is further configured to receive the directory from the source device.

4. The system of claim 1, wherein the processor-based application is further configured to store the directory and the index node number associated with the directory in the directory table.

5. The system of claim 1, wherein the processor-based application is further configured to delete a previously used directory from the storage device, wherein the previously used directory comprises the at least one of the file and the subdirectory associated with the directory in the file system.

6. The system of claim 1, wherein the processor-based application is further configured to connect to a source device via a Network Data Management Protocol, initiate a Network Data Management Protocol backup operation, connect to the storage device via the Network Data Management Protocol, and initiate a Network Data Management Protocol restore operation.

7. The system of claim 1, further comprising a cloud tiering device configured to receive the directory in a first data format from a source device, parse the data for the directory, convert the parsed data to a second data format, and output the converted parsed data in the second data format to the storage device, wherein the first data format is incompatible with the second data format.

8. A computer-implemented method for renamed directory handling for incremental file migration, the method comprising:

storing a directory in a storage device;

identifying an index node number associated with the directory in a directory table;

determining whether the index node number equals an index node number associated with another directory in the directory table; and storing at least one of a file and a subdirectory associated with the directory in a file system into the directory in the storage device in response to a determination that the index node number equals the index node number associated with the other directory in the directory table.

9. The computer-implemented method of claim 8, wherein the directory in the file system comprises a directory that was modified in the source device after a previous directory was received to be stored in the storage device.

10. The computer-implemented method of claim 8, further comprising receiving the directory from the source device.

11. The computer-implemented method of claim 8, further comprising storing the directory and the index node number associated with the directory in the directory table.

12. The computer-implemented method of claim 8, further comprising deleting a previously used directory from the storage device, wherein the previously used directory comprises the at least one of the file and the subdirectory associated with the directory in the file system.

13. The computer-implemented method of claim 8, further comprising:

connecting to a source device via a Network Data Management Protocol;

initiating a Network Data Management Protocol backup operation;

connecting to the storage device via the Network Data Management Protocol; and initiating a Network Data Management Protocol restore operation.

14. The computer-implemented method of claim 8, further comprising:

receiving the directory in a first data format from a source device;

parsing the data for the directory;

converting the parsed data to a second data format; and outputting the converted parsed data in the second data format to the storage device, wherein the first data format is incompatible with the second data format.

15. A computer program product, comprising a non-transitory computer-readable medium having a computer-readable program code embodied therein, the computer-readable program code adapted to be executed by one or more processors to implement a method for renamed directory handling for incremental file migration, the method comprising:

storing a directory in a storage device;

identifying an index node number associated with the directory in a directory table;

determining whether the index node number equals an index node number associated with another directory in the directory table; and storing at least one of a file and a subdirectory associated with the directory in a file system into the directory in the storage device in response to a determination that the index node number equals the index node number associated with the other directory in the directory table.

16. The computer program product of claim 15, wherein the directory in the file system comprises a directory that was modified in the source device after a previous directory was received to be stored in the storage device.

17. The computer program product of claim 15, further comprising receiving the directory from the source device.

18. The computer program product of claim 15, further comprising:

storing the directory and the index node number associated with the directory in the directory table; and deleting a previously used directory from the storage device, wherein the previously used directory comprises the at least one of the file and the subdirectory associated with the directory in the file system.

19. The computer program product of claim 15, further comprising:

connecting to a source device via a Network Data Management Protocol;

initiating a Network Data Management Protocol backup operation;

connecting to the storage device via the Network Data Management Protocol; and initiating a Network Data Management Protocol restore operation.

20. The computer program product of claim 15, further comprising:

receiving the directory in a first data format from a source device;

parsing the data for the directory;

converting the parsed data to a second data format; and outputting the converted parsed data in the second data format to the storage device, wherein the first data format is incompatible with the second data format.

* * * * *